United States Patent
Saito (10) Patent No.: US 10,118,268 B2
(45) Date of Patent: Nov. 6, 2018

(54) MACHINE TOOL

(71) Applicant: JTEKT CORPORATION, Osaka-shi (JP)

(72) Inventor: Toshiyuki Saito, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 502 days.

(21) Appl. No.: 14/847,773

(22) Filed: Sep. 8, 2015

(65) Prior Publication Data

US 2016/0076794 A1    Mar. 17, 2016

(30) Foreign Application Priority Data

Sep. 11, 2014   (JP) .................. 2014-185305

(51) Int. Cl.
| | |
|---|---|
| *F25B 9/00* | (2006.01) |
| *F25B 9/06* | (2006.01) |
| *F25B 9/14* | (2006.01) |
| *F03G 7/00* | (2006.01) |
| *B23Q 11/14* | (2006.01) |
| *B23Q 11/10* | (2006.01) |
| *B23Q 11/12* | (2006.01) |

(52) U.S. Cl.
CPC ........ *B23Q 11/146* (2013.01); *B23Q 11/1053* (2013.01); *B23Q 11/127* (2013.01); *B23Q 11/141* (2013.01)

(58) Field of Classification Search
CPC ...... F25B 9/00; F25B 9/06; F25B 9/14; F25B 9/145; F25B 2309/1402; F25B 2309/1403; F25B 2309/1404; F25B 2309/1405; B23Q 11/0075; F16C 33/1045; F16C 33/105; F03G 7/00; F03G 7/002; F02G 2243/54
See application file for complete search history.

(56) References Cited

U.S. PATENT DOCUMENTS

2011/0259003 A1*  10/2011  Yamamoto ............... F02G 1/04
                                                                60/530

FOREIGN PATENT DOCUMENTS

| JP | 9-97976 A | 4/1997 |
|---|---|---|
| JP | 2000-205677 A | 7/2000 |
| JP | 2003-117770 A | 4/2003 |
| JP | 2003117770 A * | 4/2003 |

* cited by examiner

*Primary Examiner* — Frantz Jules
*Assistant Examiner* — Erik Mendoza-Wilkenfe
(74) *Attorney, Agent, or Firm* — Oblon, McClelland, Maier & Neustadt, L.L.P.

(57) ABSTRACT

A machine tool includes a thermoacoustic apparatus and a fluid supply apparatus, utilizes exhaust heat from a constituent apparatus of the machine tool to cool a heat exchanger included in the thermoacoustic apparatus due to a thermoacoustic effect. Thus, a cooling fluid is cooled which is used to cool a bearing and a machining point.

8 Claims, 7 Drawing Sheets

MACHINE TOOL

INCORPORATION BY REFERENCE

The disclosure of Japanese Patent Application No. 2014-185305 filed on Sep. 11, 2014 including the specification, drawings and abstract, is incorporated herein by reference in its entirety.

BACKGROUND OF THE INVENTION

1. Field of the Invention

The invention relates to a machine tool with a cooling apparatus that utilizes a thermoacoustic effect.

2. Description of Related Art

Rotation of a rotating shaft of a machine tool causes a bearing portion to generate heat. In some machine tools, a cooling apparatus is used to cool the bearing portion in order to prevent seizure of the rotating shaft resulting from thermal expansion of the bearing portion caused by the heat generation. See, for example, Japanese Patent Application Publication No. 2003-117770 (JP 2003-117770 A).

A cooling technique utilizing a thermoacoustic effect is disclosed in Japanese Patent Application Publication No. 2000-205677 (JP 2000-205677 A).

The technique described in JP 2003-117770 A includes the cooling apparatus to cool cooling oil that cools the bearing portion. Energy is needed to operate the cooling apparatus.

JP 2000-205677 A describes a technique applied to cooling that utilizes a thermoacoustic effect for housing, warehouses, agricultural greenhouses, and in-vehicle coolers, but discloses no applied method useful for machine tools.

SUMMARY OF THE INVENTION

An object of the present invention is to provide a machine tool to which a thermoacoustic effect is applied to reduce energy consumption.

According to an aspect of the present invention, a machine tool includes:

a loop tube that is filled with a working gas;

a first stack provided in the loop tube and sandwiched between a first high-temperature heat exchanger and a first low-temperature heat exchanger, the first stack having a plurality of conducting channels in a heat transfer direction;

a second stack provided in the loop tube and sandwiched between a second high-temperature heat exchanger and a second low-temperature heat exchanger, the first stack having a plurality of conducting channels in the heat transfer direction;

a thermoacoustic apparatus that heats the first high-temperature heat exchanger to generate a temperature gradient between opposite ends of the first stack and causes spontaneous excitation, and thereby generates a standing wave and a traveling wave that allow the second low-temperature heat exchanger to be cooled; and at least one fluid supply apparatus that supplies a fluid to the machine tool.

The first low-temperature heat exchanger is cooled using a first fluid delivered from the fluid supply apparatus.

The first high-temperature heat exchanger is heated using a second fluid with a temperature thereof elevated by absorbing exhaust heat from a constituent apparatus of the machine tool when the second fluid cools the constituent apparatus.

The second low-temperature heat exchanger is cooled by a thermoacoustic effect produced by the temperature gradient generated between the first low-temperature heat exchanger and the first high-temperature heat exchanger.

A third fluid is cooled by the second low-temperature heat exchanger.

In the machine tool according to the aspect, the first high-temperature heat exchanger of the thermoacoustic apparatus is heated by the second fluid with the temperature thereof elevated by exhaust heat from the constituent apparatus of the machine tool. Spontaneous excitation then occurs to generate the standing wave and the traveling wave, which enable the second low-temperature heat exchanger to be cooled. The second low-temperature heat exchanger cooled to a low temperature is used to cool the third fluid, which is then used to cool a component. Thus, a machine tool can be provided which uses only low energy consumption for cooling.

The machine tool according to the aspect may be configured such that the second high-temperature heat exchanger is cooled using the first fluid delivered from the fluid supply apparatus.

According to the aspect, the second high-temperature heat exchanger is cooled to enhance the thermoacoustic effect. Thus, a machine tool can be provided which allows the second low-temperature heat exchanger to be cooled to a lower temperature.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention will be described below based on an example where the embodiment is applied to a machine tool that performs cutting using a rotary tool.

Figure 1:
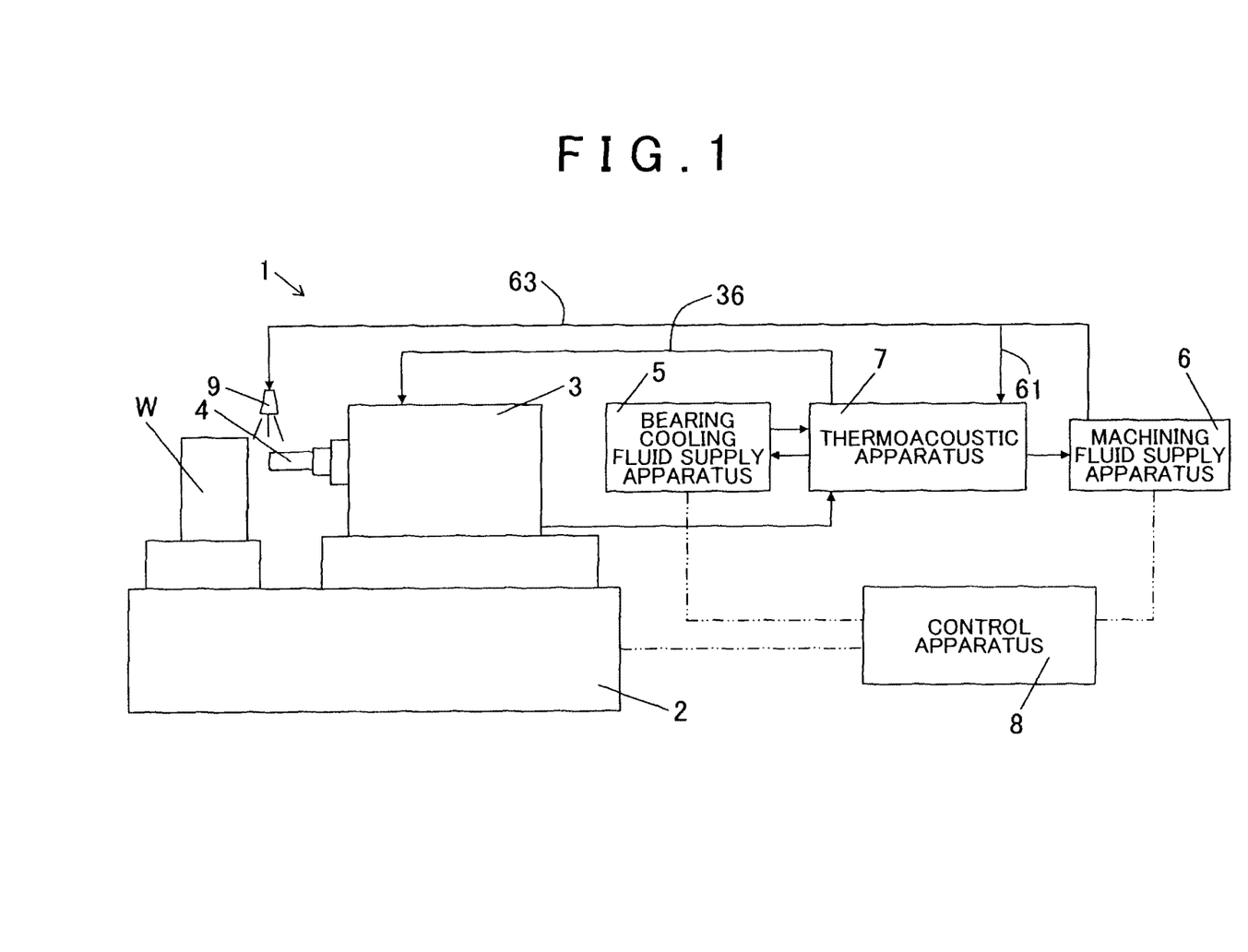
FIG. 1 is a schematic diagram depicting the general configuration of a machine tool of a first embodiment.

As depicted in FIG. 1, a machine tool 1 has, on a bed 2, a workpiece W and a tool 4 rotatably supported by a main spindle 3. The workpiece W and the main spindle 3 can be moved relative to each other by a feeding apparatus not depicted in the drawings. The machine tool 1 has a bearing cooling fluid supply apparatus 5 that supplies a bearing cooling fluid to a bearing in order to prevent the main spindle 3 from being thermally expanded when the main spindle 3 generates heat as a result of rotation of the tool 4. The machine tool 1 has a machining fluid supply apparatus 6 that supplies a machining fluid in order to cool the workpiece W being machined and the tool 4, and a nozzle 9 that supplies the machining fluid to a machining point. The machine tool 1 further has a thermoacoustic apparatus 7 in order to cool the bearing cooling fluid. The machine tool 1 also has a control apparatus 8 that controls the operation of a machine tool body, the bearing cooling fluid supply apparatus 5, and the machining fluid supply apparatus 6.

Figure 2:
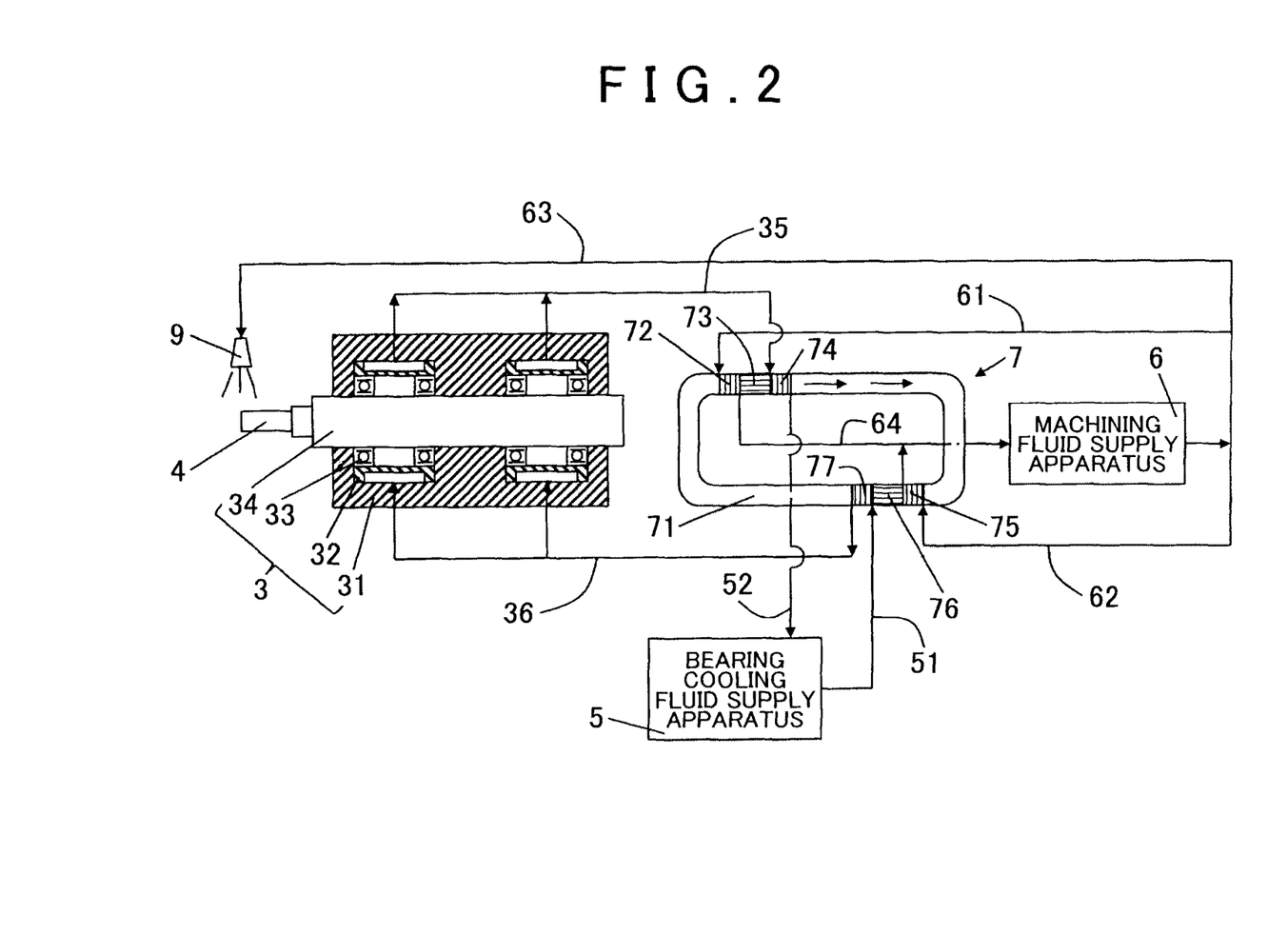
FIG. 2 is a diagram depicting details of a cooling mechanism of the first embodiment.

FIG. 2 depicts details of the thermoacoustic apparatus 7 and a main spindle cooling circuit in the first embodiment.

The thermoacoustic apparatus 7 includes a loop tube 71 which is filled with a working gas such as helium or neon, a first stack 73 provided on one side of the loop tube 71 and sandwiched between a first high-temperature heat exchanger 74 and a first low-temperature heat exchanger 72, and a second stack 76 provided on the other side of the loop tube 71 and sandwiched between a second high-temperature heat exchanger 75 and a second low-temperature heat exchanger 77. The first high-temperature heat exchanger 74, the first low-temperature heat exchanger 72, and the first stack 73 have a plurality of conducting channels with which the first high-temperature heat exchanger 74 and the first low-temperature heat exchanger 72 and the first stack 73 are in communication in an axial direction of the loop tube 71. The second high-temperature heat exchanger 75, the second low-temperature heat exchanger 77, and the second stack 76 have a plurality of conducting channels with which the second high-temperature heat exchanger 75 and the second low-temperature heat exchanger 77 and the second stack 76 are in communication in the axial direction of the loop tube 71. Moreover, the first high-temperature heat exchanger 74, the first low-temperature heat exchanger 72, the second high-temperature heat exchanger 75, and the second low-temperature heat exchanger 77 include a channel orthogonal to the axial direction, and allow a fluid to pass through the channel to enable efficient heat exchange.

When the first high-temperature heat exchanger 74 is heated and the first low-temperature heat exchanger 72 is cooled to generate a temperature gradient between the opposite ends of the first stack 73, spontaneous excitation occurs to generate a standing wave and a traveling wave in the working gas. When the waves travel along the loop tube and reach the second stack 76 sandwiched between the second high-temperature heat exchanger 75 and the second low-temperature heat exchanger 77, heat is transferred in a direction opposite to the traveling direction of the waves. That is, the temperature of the second low-temperature heat exchanger 77 decreases below the temperature of the second high-temperature heat exchanger 75.

The main spindle 3 supports a spindle 34 via bearings 33 provided in a housing 32 held by a main body 31 such that the spindle 34 is rotatable. The spindle 34 holds the tool 4 at a tip of the spindle 34 and is rotated by a motor not depicted in the drawings. Rotation of the spindle 34 causes friction between the spindle 34 and the bearings 33 to generate heat, which elevates the temperature of the housing 32. The bearing cooling fluid supply apparatus 5 supplies a bearing cooling fluid to the main spindle 3 via a conduit 51, the second low-temperature heat exchanger 77, and a conduit 36. A groove is formed in an outer periphery of the housing 32 such that the bearing cooling fluid supplied via the conduit 36 circulates along the outer periphery of the housing 32 and is then discharged to a conduit 35. At this time, the bearing cooling fluid draws the heat from the housing 32 to have its temperature elevated and becomes a high-temperature bearing cooling fluid. The high-temperature bearing cooling fluid then heats the first high-temperature heat exchanger 74 via the conduit 35 and returns to the bearing cooling fluid supply apparatus 5 via a conduit 52.

The machining fluid supply apparatus 6 supplies the machining fluid to the first low-temperature heat exchanger 72 via a conduit 61 and to the second high-temperature heat exchanger 75 via a conduit 62. Normally, the machining fluid supply apparatus 6 is cooled by air, and the machining fluid is substantially at room temperature.

In the above-described conduit configuration, the first low-temperature heat exchanger 72 and the second high-temperature heat exchanger 75 are cooled to a temperature close to the room temperature by the machining fluid. The first high-temperature heat exchanger 74 is heated to a high temperature by the high-temperature bearing cooling fluid, which is the bearing cooling fluid with the temperature thereof elevated. As a result, a temperature gradient is generated between the first low-temperature heat exchanger 72 and the first high-temperature heat exchanger 74, leading to spontaneous excitation of the working gas, in which waves are generated.

When the waves travel along the loop tube to reach the second stack 76 sandwiched between the second high-temperature heat exchanger 75 and the second low-temperature heat exchanger 77, the temperature of the second low-temperature heat exchanger 77 decreases below the temperature of the second high-temperature heat exchanger 75. That is, the temperature of the second low-temperature heat exchanger 77 decreases below the room temperature to enable cooling of the bearing cooling fluid to be supplied to the main spindle 3 via the second low-temperature heat exchanger 77.

In the above-described structure, exhaust heat generated by the main spindle 3 is utilized to enable cooling of the bearing cooling fluid to be supplied to the main spindle 3. Thus, a machine tool can be provided which needs only low energy consumption to cool the main spindle 3.

The example of the main spindle 3 using a rolling bearing as the bearing 33 has been illustrated. However, if a hydrostatic bearing is used as the bearing, oil discharged from a bearing pocket may be used as a high-temperature fluid.

Figure 3:
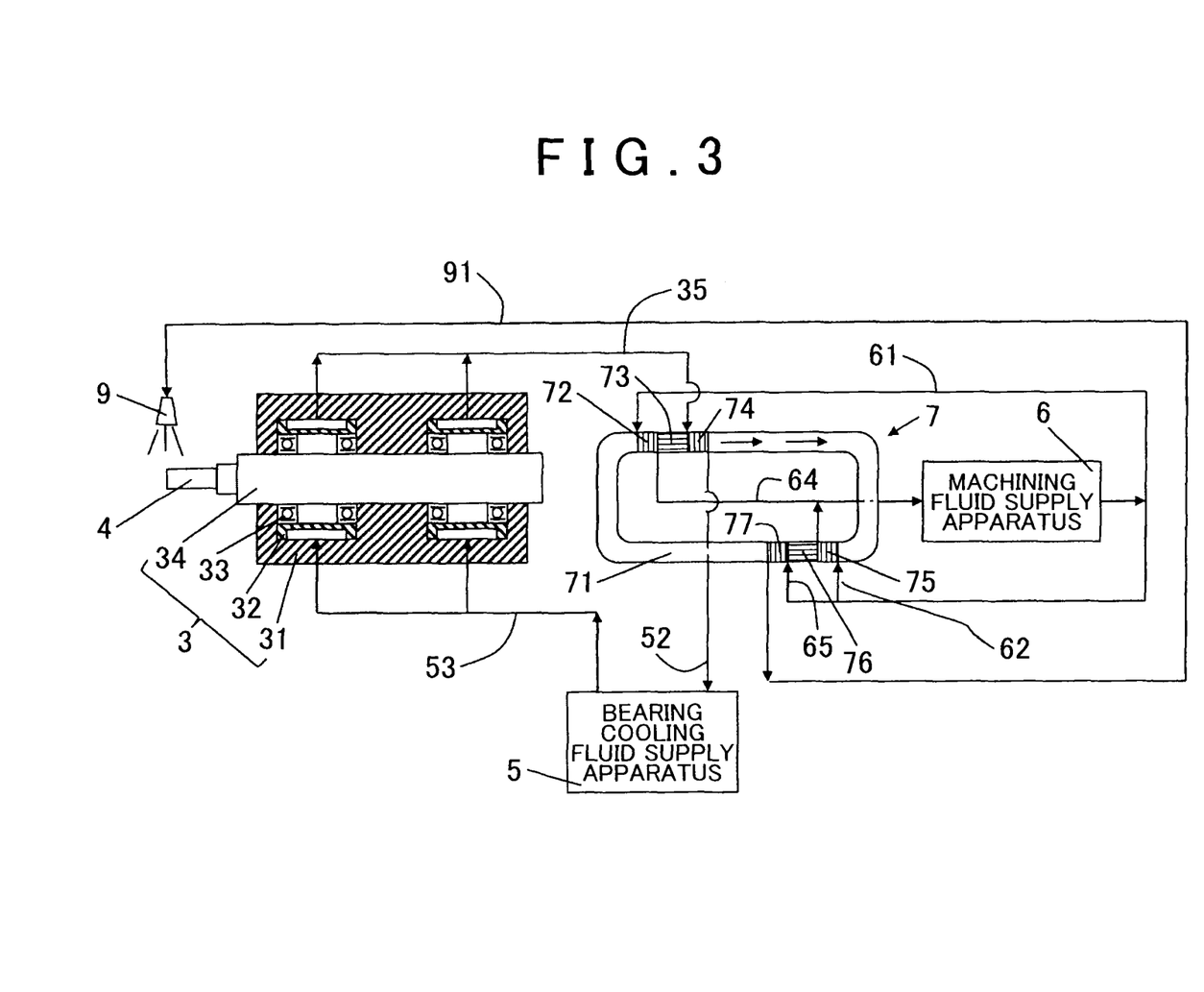
FIG. 3 is a diagram depicting details of a cooling mechanism of a second embodiment.

Now, a second embodiment will be described based on FIG. 3.

The second embodiment utilizes exhaust heat from the main spindle 3 to cool the machining fluid. The structures of the main spindle 3, the bearing cooling fluid supply apparatus 5, the machining fluid supply apparatus 6, and the thermoacoustic apparatus 7 are similar to the structures of these components in the first embodiment. The bearing cooling fluid is fed from the bearing cooling fluid supply apparatus 5 to the main spindle 3 via the conduit 53. The bearing cooling fluid draws the heat from the housing 32 to have its temperature elevated and becomes a high-temperature bearing cooling fluid. The high-temperature bearing cooling fluid then heats the first high-temperature heat exchanger 74 via the conduit 35 and returns to the bearing cooling fluid supply apparatus 5 via the conduit 52. In the bearing cooling fluid supply apparatus 5, the bearing cooling fluid is cooled nearly to the room temperature by air.

The machining fluid fed from the machining fluid supply apparatus 6 is supplied to the first low-temperature heat exchanger 72 via the conduit 61, the second high-temperature heat exchanger 75 via the conduit 62, and the second low-temperature heat exchanger 77 via a conduit 65. The machining fluid having passed through the second low-temperature heat exchanger 77 is supplied to the nozzle 9 through a conduit 91, and in a machining section, cools the tool 4 and the workpiece W.

In the above-described conduit configuration, the first low-temperature heat exchanger 72 and the second high-temperature heat exchanger 75 are cooled to a temperature close to the room temperature by the machining fluid. The first high-temperature heat exchanger 74 is heated to a high temperature by the high-temperature bearing cooling fluid, which is the bearing cooling fluid with the temperature thereof elevated. As a result, a temperature gradient is generated between the first low-temperature heat exchanger 72 and the first high-temperature heat exchanger 74 to cause spontaneous excitation, thus generating waves.

When the waves travel along the loop tube to reach the second stack 76 sandwiched between the second high-temperature heat exchanger 75 and the second low-temperature heat exchanger 77, the temperature of the second low-temperature heat exchanger 77 decreases below the temperature of the second high-temperature heat exchanger 75. That is, the temperature of the second low-temperature heat exchanger 77 decreases below the room temperature to enable cooling of the machining fluid to be supplied to the machining section via the second low-temperature heat exchanger 77.

In the above-described structure, exhaust heat generated by the main spindle 3 is utilized to enable cooling of the machining fluid to be supplied to the machining section. Thus, a machine tool can be provided which needs only low energy consumption to cool the machining fluid.

Figure 4:
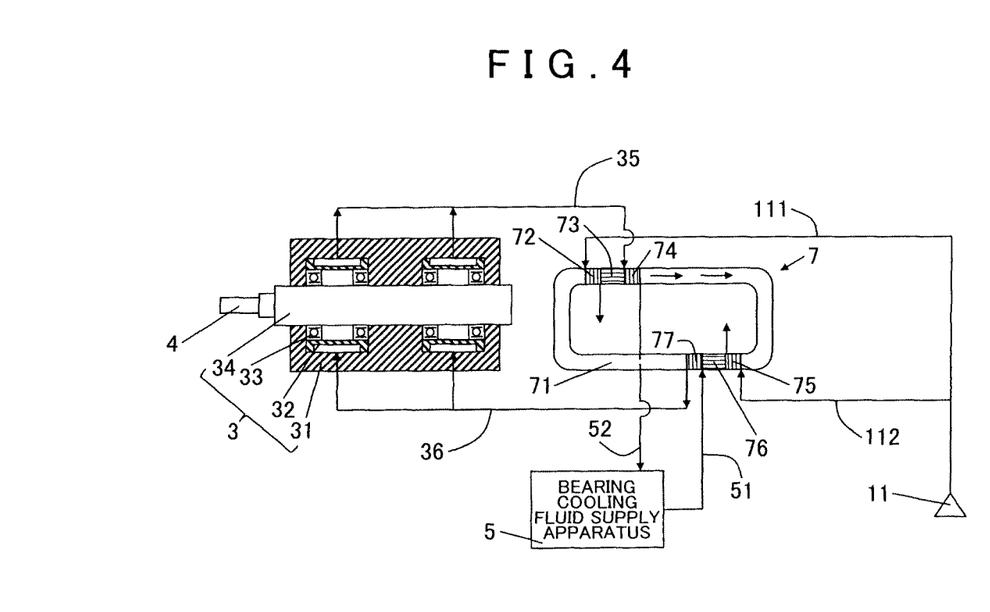
FIG. 4 is a diagram depicting details of a cooling mechanism of a third embodiment.

Now, a third embodiment will be described based on FIG. 4.

The third embodiment includes an air supply apparatus 11 instead of the machining fluid supply apparatus 6 in the first embodiment. Exhaust heat from the main spindle 3 is utilized to cool the bearing cooling fluid supplied to the main spindle 3. The structures of the main spindle 3, the bearing cooling fluid supply apparatus 5, and the thermoacoustic apparatus 7 are similar to the structures of these components in the first embodiment. The bearing cooling fluid is fed from the bearing cooling fluid supply apparatus 5 to the main spindle 3 via the conduit 51, the second low-temperature heat exchanger 77, and the conduit 36. The bearing cooling fluid draws the heat from the housing 32 to have its temperature elevated and becomes a high-temperature bearing cooling fluid. The high-temperature bearing cooling fluid then heats the first high-temperature heat exchanger 74 via the conduit 35 and returns to the bearing cooling fluid supply apparatus 5 via the conduit 52.

Air substantially at room temperature fed from the air supply apparatus 11 passes through the first low-temperature heat exchanger 72 via a conduit 111 and the second high-temperature heat exchanger 75 via the conduit 112, and is subsequently emitted to the atmosphere.

In the above-described conduit configuration, the first low-temperature heat exchanger 72 and the second high-temperature heat exchanger 75 are cooled to a temperature close to the room temperature by air. The first high-temperature heat exchanger 74 is heated to a high temperature by the high-temperature bearing cooling fluid, which is the bearing cooling fluid with the temperature thereof elevated. As a result, a temperature gradient is generated between the first low-temperature heat exchanger 72 and the first high-temperature heat exchanger 74 to cause spontaneous excitation, thus generating waves.

When the waves travel along the loop tube to reach the second stack 76 sandwiched between the second high-temperature heat exchanger 75 and the second low-temperature heat exchanger 77, the temperature of the second low-temperature heat exchanger 77 decreases below the temperature of the second high-temperature heat exchanger 75. That is, the temperature of the second low-temperature heat exchanger 77 decreases below the room temperature to enable cooling of the bearing cooling fluid to be supplied to the main spindle via the second low-temperature heat exchanger 77.

In the above-described structure, exhaust heat generated by the main spindle 3 is utilized to enable cooling of the bearing cooling fluid to be supplied to the main spindle 3. Thus, a machine tool can be provided which needs only low energy consumption to cool the main spindle 3.

Figure 5:
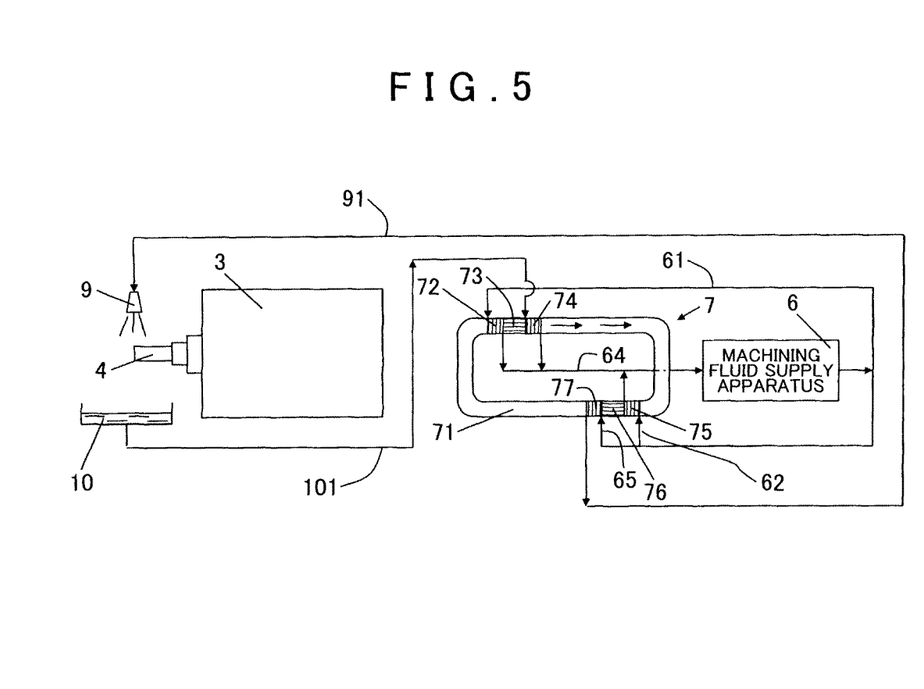
FIG. 5 is a diagram depicting details of a cooling mechanism of a fourth embodiment.

Now, a fourth embodiment will be described based on FIG. 5.

Instead of the bearing cooling fluid for the main spindle 3 in the first embodiment, the fourth embodiment utilizes the machining fluid having its temperature elevated after cooling the machining section, as the high-temperature machining fluid. The structures of the machining fluid supply apparatus 6 and the thermoacoustic apparatus 7 are similar to the structures of these components in the first embodiment. The machining fluid supplied to the machining section through the nozzle 9 cools the tool 4 and the workpiece W and has its temperature elevated. The high-temperature machining fluid is then collected in a machining fluid receiver 10, heats the first high-temperature heat exchanger 74 via a conduit 101, and subsequently returns to the machining fluid supply apparatus 6 via a conduit 64. The machining fluid fed from the machining fluid supply apparatus 6 circulates through the first low-temperature heat exchanger 72 via the conduit 61 and through the second high-temperature heat exchanger 75 via the conduit 62, and then returns to the machining fluid supply apparatus 6 via the conduit 64.

The machining fluid having passed through the second low-temperature heat exchanger 77 is supplied to the nozzle 9 through the conduit 91, and in the machining section, cools the tool 4 and the workpiece W.

In the above-described conduit configuration, the first low-temperature heat exchanger 72 and the second high-temperature heat exchanger 75 are cooled to a temperature close to the room temperature by the machining fluid. The first high-temperature heat exchanger 74 is heated to a high temperature by the high-temperature machining fluid with the temperature thereof elevated. As a result, a temperature gradient is generated between the first low-temperature heat exchanger 72 and the first high-temperature heat exchanger 74 to cause spontaneous excitation, thus generating waves.

When the waves travel along the loop tube to reach the second stack 76 sandwiched between the second high-temperature heat exchanger 75 and the second low-temperature heat exchanger 77, the temperature of the second low-temperature heat exchanger 77 decreases below the temperature of the second high-temperature heat exchanger 75. That is, the temperature of the second low-temperature heat exchanger 77 decreases below the room temperature to enable cooling of the machining fluid to be supplied to the machining section via the second low-temperature heat exchanger 77.

In the above-described structure, exhaust heat generated by the machining section is utilized to enable cooling of the bearing cooling fluid to be supplied to the machining section. Thus, a machine tool can be provided which needs only low energy consumption to cool the machining section.

Figure 6:
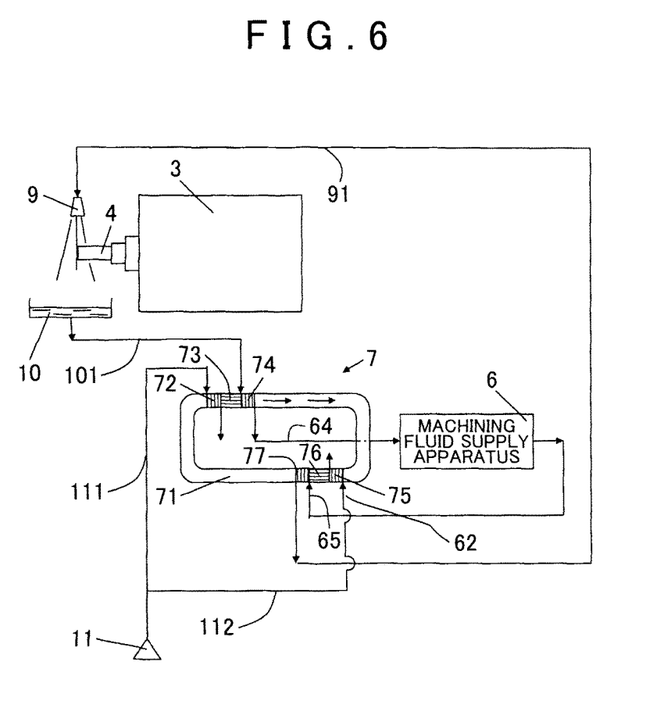
FIG. 6 is a diagram depicting details of a cooling mechanism of a fifth embodiment.

Now, a fifth embodiment will be described based on FIG. 6.

In the fifth embodiment, the first low-temperature heat exchanger 72 and the second high-temperature heat exchanger 75 are cooled by air rather than by the machining fluid as in the fourth embodiment. The structures of the machining fluid supply apparatus 6 and the thermoacoustic apparatus 7 are similar to the structures of these components in the first embodiment. The machining fluid supplied to the machining section through the nozzle 9 cools the tool 4 and the workpiece W and has its temperature elevated. The high-temperature machining fluid is collected in the machining fluid receiver 10, heats the first high-temperature heat exchanger 74 via the conduit 101, and then returns to the machining fluid supply apparatus 6 via the conduit 64. The machining fluid fed from the machining fluid supply apparatus 6 and passing through the conduit 65 and the second low-temperature heat exchanger 77 is supplied to the nozzle 9 through the conduit 91, and in the machining section, cools the tool 4 and the workpiece W.

Air substantially at room temperature fed from the air supply apparatus 11 passes through the first low-temperature heat exchanger 72 via the conduit 111 and the second high-temperature heat exchanger 75 via the conduit 112, and is subsequently emitted to the atmosphere.

In the above-described conduit configuration, the first low-temperature heat exchanger 72 and the second high-temperature heat exchanger 75 are cooled to a temperature close to the room temperature by air. The first high-temperature heat exchanger 74 is heated to a high temperature by the high-temperature machining fluid with the temperature thereof elevated. As a result, a temperature gradient is generated between the first low-temperature heat exchanger 72 and the first high-temperature heat exchanger 74 to cause spontaneous excitation, thus generating waves.

When the waves travel along the loop tube to reach the second stack 76 sandwiched between the second high-temperature heat exchanger 75 and the second low-temperature heat exchanger 77, the temperature of the second low-temperature heat exchanger 77 decreases below the temperature of the second high-temperature heat exchanger 75. That is, the temperature of the second low-temperature heat exchanger 77 decreases below the room temperature to enable cooling of the machining fluid to be supplied to the machining section via the second low-temperature heat exchanger 77, the conduit 91, and the nozzle 9.

In the above-described structure, exhaust heat generated by the machining section is utilized to enable cooling of the machining fluid to be supplied to the machining section. Thus, a machine tool can be provided which needs only low energy consumption to cool the machining fluid.

Figure 7:
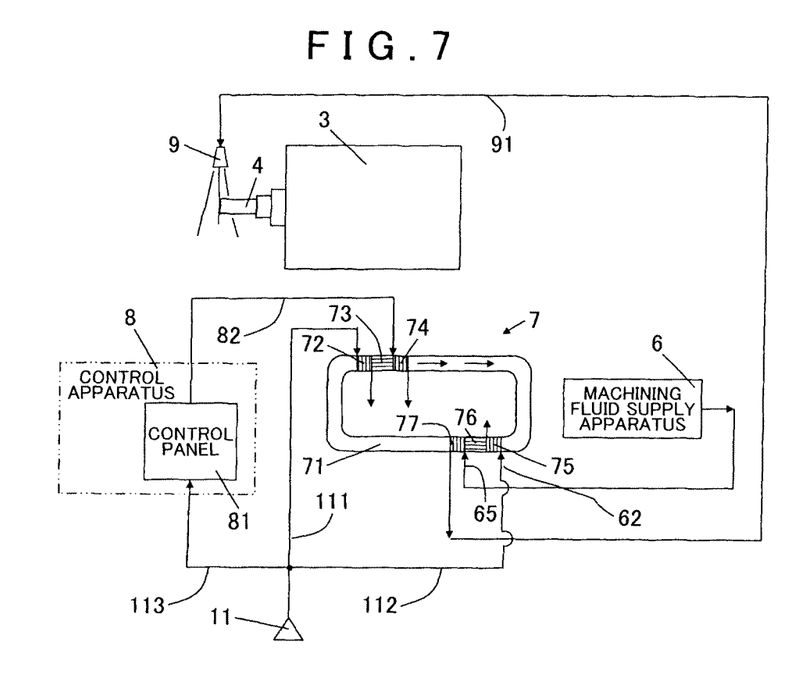
FIG. 7 is a diagram depicting details of a cooling mechanism of a sixth embodiment.

Now, a sixth embodiment will be described based on FIG. 7.

In the sixth embodiment, the first high-temperature heat exchanger 74 is heated by high-temperature air rather than by the high-temperature machining fluid as in the fifth embodiment. The structures of the machining fluid supply apparatus 6 and the thermoacoustic apparatus 7 are similar to the structures of these components in the first embodiment. Air cooling the inside of a control panel 81 that is a component of the control apparatus 8 has its temperature elevated. The high-temperature air then heats the first high-temperature heat exchanger 74 via a conduit 82 and is then emitted to the atmosphere.

The machining fluid fed from the machining fluid supply apparatus 6 and passing through the conduit 65 and the second low-temperature heat exchanger 77 is cooled. The machining fluid is then supplied to the nozzle 9 through the conduit 91, and in the machining section, cools the tool 4 and the workpiece W.

Air substantially at room temperature fed from the air supply apparatus 11 passes through the first low-temperature heat exchanger 72 via the conduit 111 and the second high-temperature heat exchanger 75 via the conduit 112, and is subsequently emitted to the atmosphere.

In the above-described conduit configuration, the first low-temperature heat exchanger 72 and the second high-temperature heat exchanger 75 are cooled to a temperature close to the room temperature by air. The first high-temperature heat exchanger 74 is heated to a high temperature by the high-temperature air with the temperature thereof elevated. As a result, a temperature gradient is generated between the first low-temperature heat exchanger 72 and the first high-temperature heat exchanger 74 to cause spontaneous excitation, thus generating waves.

When the waves travel along the loop tube to reach the second stack 76 sandwiched between the second high-temperature heat exchanger 75 and the second low-temperature heat exchanger 77, the temperature of the second low-temperature heat exchanger 77 decreases below the temperature of the second high-temperature heat exchanger 75. That is, the temperature of the second low-temperature heat exchanger 77 decreases below the room temperature to enable cooling of the machining fluid to be supplied to the machining section via the second low-temperature heat exchanger 77, the conduit 91, and the nozzle 9.

In the above-described structure, exhaust heat generated by the machining section is utilized to enable cooling of the machining fluid to be supplied to the machining section. Thus, a machine tool can be provided which needs only low energy consumption to cool the machining fluid.

Besides the above-described embodiments, a desired portion may be cooled using any conduit configuration in which the first high-temperature heat exchanger 74 is heated by any one of the items selected from Group A: the high-temperature bearing cooling fluid; the high-temperature machining fluid; and the high-temperature air, the first low-temperature heat exchanger 72 is cooled by any one of the items selected from Group B: the bearing cooling fluid; the machining fluid; and air, the second high-temperature heat exchanger 75 is cooled by any one of the items selected from Group C: the bearing cooling fluid; the machining fluid; and air, and the second low-temperature heat exchanger 77 cools any one of the items selected from Group D: the bearing cooling fluid; the machining fluid; and air. It is also preferable that the second high-temperature heat exchanger 75 be cooled by natural heat radiation in an environment where the thermoacoustic apparatus 7 is disposed rather than being cooled by the fluid.

The cooling of the main spindle 3 and the cooling of the machining fluid have been described. However, the portion to be cooled may be any other portion of the machine tool such as a feed screw or a workpiece dimension measuring apparatus.

Alternatively, high-temperature air may be used which has its temperature elevated by cooling electric equipment such as a motor or an electric heater.

What is claimed is:
1. A machine tool comprising:
a tool to be supplied with a first fluid to cool the tool;
a thermoacoustic apparatus comprising
a loop tube that is filled with a working gas;
a first stack provided in the loop tube and sandwiched between a first high-temperature heat exchanger and a first low-temperature heat exchanger, the first stack having a plurality of conducting channels in a heat transfer direction; and a second stack provided in the loop tube and sandwiched between a second high-temperature heat exchanger and a second low-temperature heat exchanger, the second stack having a plurality of conducting channels in the heat transfer direction;

wherein the thermoacoustic apparatus heats the first high-temperature heat exchanger to generate a temperature gradient between opposite ends of the first stack and causes spontaneous excitation, and thereby generates a standing wave and a traveling wave that allows the second low-temperature heat exchanger to be cooled; and the first low-temperature heat exchanger is cooled using a first fluid to be supplied to the tool, the first high-temperature heat exchanger is heated using a second fluid with a temperature of the second fluid elevated by absorbing exhaust heat from the constituent apparatus of the tool when the second fluid cools the constituent apparatus, the second low-temperature heat exchanger is cooled by a thermoacoustic effect produced by the temperature gradient generated between the first low-temperature heat exchanger and the first high-temperature heat exchanger, and a third fluid is cooled by the second low-temperature heat exchanger.

2. The machine tool according to claim 1, wherein
a machining fluid serves as the first fluid to cool the first low-temperature heat exchanger,
a bearing cooling fluid cools a bearing portion to have a temperature of the bearing cooling fluid elevated and then serves as the second fluid to heat the first high-temperature heat exchanger,
the second low-temperature heat exchanger is cooled by the thermoacoustic effect produced by the temperature gradient generated between the first low-temperature heat exchanger and the first high-temperature heat exchanger, and
the bearing cooling fluid serves as the third fluid and is cooled by the second low-temperature heat exchanger.

3. The machine tool according to claim 1, wherein
a machining fluid serves as the first fluid to cool the first low-temperature heat exchanger,
a bearing cooling fluid cools a bearing portion to have a temperature of the bearing cooling fluid elevated and then serves as the second fluid to heat the first high-temperature heat exchanger,
the second low-temperature heat exchanger is cooled by the thermoacoustic effect produced by the temperature gradient generated between the first low-temperature heat exchanger and the first high-temperature heat exchanger, and
the machining fluid serves as the third fluid and is cooled by the second low-temperature heat exchanger.

4. The machine tool according to claim 1, wherein
air serves as the first fluid to cool the first low-temperature heat exchanger,
a bearing cooling fluid cools a bearing portion to have a temperature of the bearing cooling fluid elevated and then serves as the second fluid to heat the first high-temperature heat exchanger,
the second low-temperature heat exchanger is cooled by the thermoacoustic effect produced by the temperature gradient generated between the first low-temperature heat exchanger and the first high-temperature heat exchanger, and
the bearing cooling fluid serves as the third fluid and is cooled by the second low-temperature heat exchanger.

5. The machine tool according to claim 1, wherein
a machining fluid serves as the first fluid to cool the first low-temperature heat exchanger,
the machining fluid cools a machining section to have a temperature of the machining fluid elevated and then serves as the second fluid to heat the first high-temperature heat exchanger,
the second low-temperature heat exchanger is cooled by the thermoacoustic effect produced by the temperature gradient generated between the first low-temperature heat exchanger and the first high-temperature heat exchanger, and
the machining fluid serves as the third fluid and is cooled by the second low-temperature heat exchanger.

6. The machine tool according to claim 1, wherein
air serves as the first fluid to cool the first low-temperature heat exchanger,
a machining fluid cools a machining section to have a temperature of the machining fluid elevated and then serves as the second fluid to heat the first high-temperature heat exchanger,
the second low-temperature heat exchanger is cooled by the thermoacoustic effect produced by the temperature gradient generated between the first low-temperature heat exchanger and the first high-temperature heat exchanger, and
the machining fluid serves as the third fluid and is cooled by the second low-temperature heat exchanger.

7. The machine tool according to claim 1, wherein
air serves as the first fluid to cool the first low-temperature heat exchanger,
the air cools a controller to have a temperature of the air elevated and then serves as the second fluid to heat the first high-temperature heat exchanger,
the second low-temperature heat exchanger is cooled by the thermoacoustic effect produced by the temperature gradient generated between the first low-temperature heat exchanger and the first high-temperature heat exchanger, and
a machining fluid serves as the third fluid and is cooled by the second low-temperature heat exchanger.

8. The machine tool according to claim 1, wherein
the second high-temperature heat exchanger is cooled using the first fluid.

* * * * *